United States Patent [19]
Moore

[11] Patent Number: 6,067,622
[45] Date of Patent: *May 23, 2000

[54] SOFTWARE SECURITY SYSTEM USING REMOVE FUNCTION TO RESTRICT UNAUTHORIZED DUPLICATING AND INSTALLATION OF AN APPLICATION PROGRAM

[76] Inventor: Steven Jerome Moore, 58 Butterfield Rd., Newton, Conn. 06470

[*] Notice: This patent issued on a continued prosecution application filed under 37 CFR 1.53(d), and is subject to the twenty year patent term provisions of 35 U.S.C. 154(a)(2).

[21] Appl. No.: 08/581,809

[22] Filed: Jan. 2, 1996

[51] Int. Cl.[7] ............... H04L 9/00; G06F 12/14
[52] U.S. Cl. ............. 713/200; 713/202; 395/712; 380/3; 380/45
[58] Field of Search ............... 395/186, 188.01, 395/187.01, 704, 709, 712, 567, 568, 580, 183.14; 380/3, 4, 25, 23, 45; 364/222.5, 286.4, 286.5; 713/200, 201, 202

[56] References Cited

U.S. PATENT DOCUMENTS

| | | | |
|---|---|---|---|
| 4,558,176 | 12/1985 | Arnold et al. | 380/4 |
| 4,644,493 | 2/1987 | Chandra et al. | 380/4 |
| 4,652,990 | 3/1987 | Pailen et al. | 380/4 |
| 4,688,169 | 8/1987 | Joshi | 340/825.34 |
| 4,796,220 | 1/1989 | Volje | 380/4 |
| 4,866,769 | 9/1989 | Karp | 380/4 |
| 5,109,413 | 4/1992 | Comerford et al. | 380/4 |
| 5,113,518 | 5/1992 | Durst, Jr. et al. | 395/186 |
| 5,182,770 | 1/1993 | Medveczky et al. | 380/4 |
| 5,199,066 | 3/1993 | Logan | 380/4 |
| 5,267,311 | 11/1993 | Bakhoum | 380/4 |
| 5,276,738 | 1/1994 | Hirsch | 380/46 |
| 5,343,524 | 8/1994 | Mu et al. | 380/4 |
| 5,402,492 | 3/1995 | Goodman et al. | 380/25 |
| 5,615,263 | 3/1997 | Takahashi | 380/4 |
| 5,619,408 | 4/1997 | Black et al. | 395/567 |
| 5,675,645 | 10/1997 | Schwartz et al. | 380/4 |

FOREIGN PATENT DOCUMENTS

| | | | |
|---|---|---|---|
| 0191162 | 8/1986 | European Pat. Off. | G06F 12/14 |
| 0413350 | 2/1991 | European Pat. Off. | G06F 1/00 |
| 62-187937 | 8/1987 | Japan | G06F 9/06 |
| 63-298529 | 12/1988 | Japan | G06F 9/06 |

*Primary Examiner*—Dieu-Minh Le

[57] ABSTRACT

Disclosed is a software-based system and method for restricting unlicensed software duplication and installation. The invention features a software security system using a remove function for restricting unauthorized duplication and installation of an application program onto one or more data processing systems. The software security system includes an installation program and an application program. The application program as written is "un-runnable" owing to nonsense instruction sets dispersed throughout the actual programming instructions of the application program. An installation program routine comprises software instruction sets for removing the nonsense instruction sets in the application program. The software security system executes an instruction set to delete the nonsense instruction sets upon installation of the application program into one or more data processing systems thereby allowing application program to be executed once loaded onto the system(s), upon correspondence between an internal run key and an execution-time run key.

5 Claims, 9 Drawing Sheets

SOFTWARE SECURITY SYSTEM USING REMOVE FUNCTION TO RESTRICT UNAUTHORIZED DUPLICATING AND INSTALLATION OF AN APPLICATION PROGRAM

BACKGROUND OF INVENTION

1. Field of Invention

The present invention relates generally to a software-based system and method for reducing unlicensed software duplication. In particular, it relates to a method for restricting hard-drive installation of software to authorized purchasers, and for reducing unauthorized redistribution of software.

2. Brief Description of the Prior Art

Over the past twenty years the number of persons owning or utilizing a computer on a daily basis has grown tremendously. Along with the proliferation and popularity of computer systems has come a immense array of computer programs for specialized applications such as spread sheets, mathematical modeling, desk top publishing and computer games. Such computer programs usually are provided as machine-readable information recorded on a magnetic storage medium such as a diskette or floppy disk. Many of these computer programs require many of thousands of hours for their development, and thus significant monetary outlays by their developers. Such large development costs must be recouped by sales of the product, product which may face considerable competition in the market place at its launch.

Unfortunately, the ethical software industry is plagued not only by fierce competition within its own ranks, but also by unsavory predatory practices from without. Among the most threatening of these practices is that of software piracy. Software piracy involves the unauthorized copying of computer software. Unauthorized copies cost the software industry hundreds-of-millions of dollars in licensing fees each year. Since the pirate has no development costs, and typically substantially less overhead than the ethical software developer, pirated software more often than not sells at prices considerably below that of the manufacturer. Because of the often large discrepancy between the price of unauthorized and authorized computer software, there is a substantial and continuing black market in illegally-copied software.

Duplication of computer software, particularly software distributed on magnetic media, is typically quite easy. In the absence of some form of protection, a software package from an authorized dealer may be copied numerous times on a single piece of hardware. While, in theory, copyright laws protect software developers from unauthorized duplication of their wares, it is often difficult, impractical, and costly, for developers to assert their copyrights against a small company or an individual who makes only a few copies. The employment of license agreements suffers from similar difficulties. In many instances, it is not possible for the software developer to discern the identity of an unauthorized user of its software. For example, it is not uncommon for several individuals to combine their resources to purchase one software program and then make a number of copies for separate use of the software by each of them on their own personal computers. When the consumer is faced with a low risk of being detected and prosecuted for illicitly copying software, the dis-incentive in passing along "hot copies" to friends and acquaintances is greatly reduced.

Various technology-based solutions have been proposed to minimize the problem of software piracy. In general, these "copy protection" technologies can be broadly characterized as involving four basic strategies: "access limitation," "copy detection," "duplication limitation" and "copy inactivation."

"Access limitation" techniques prohibit access to programs installed on a computer's hard drive, also referred to as the "fixed drive" or "Winchester drive," such that data contained in the program, and the program itself, can not be copied without the tacit approval of the authorized licensee. Such "access-limiting" techniques include hardware locks such as the mechanical key and lock system of stand-alone computers which require that the lock be in the "on" position to enable the stand alone system to operate. It also includes systems that require for operation the interface of an electronic key with the computing system as through the serial ports of the computer, as disclosed, for example, in U.S. Pat. No. 5,343,524, or to be interfaced through the keyboard, as disclosed, for example, in U.S. Pat. No. 5,402,492.

Access-limitation techniques may permit access to the operating system and other programs on a hard-drive but limit utilization of a particular program stored on the hard drive. For example, hardware keys which contain code that matches the serial number for a particular software may be employed. In such an approach, "protected" programs stored on a hard-drive cannot be run unless the matching hardware key is inserted into a port on the computer. On the other hand, "non-protected" programs may be freely utilized. Similarly, certain access-limiting programs require "software keys" to be inserted into the disk drive in order for a "protected" program on the hard-drive to be utilized.

Another commonly-used "access limitation" scheme employs the use of an authorization code, such as a password, key number etc., which must be obtained from the software supplier and entered when using the software. If the password or code is not entered, the program is designed to terminate.

The problem with all access-limiting techniques is that such techniques only prohibit illicit duplication if the licensee of the product vigilantly protects access to the program. This is often not the case. For example, a hardware or software key can be shared with others permitting them to run the "protected" program on their own computers. Likewise, a code or password easily can be supplied to a person who is unauthorized to use a particular piece of software.

Another type of technique used to dissuade unauthorized coping is "copy detection." "Copy detection" techniques have as their primary goal the identification of illicit copies, that is, such techniques seek to distinguish illicit copies from the authorized original. One "copy detection" scheme involves the destruction, often by laser, of a particular sector on an the authorized disk during manufacture. In such a scheme, the authorized disk remains operable as upon invocation the sector is verified as unwritable and execution is continued. A copy of such disk, however, easily can be distinguished from the authorized disk since it lacks the obliterated sector.

One of the most widely employed "copy detection" schemes involves the practice of placing serial numbers in authorized software. Such practice permits tracing of unauthorized copies to the person to whom the authorized software was originally sold. Another approach is to require the authorized user, upon the first start-up of the software, to input the user's name which is stored in the software's code such that the user's name will appear on every subsequent initialization screen. These practices are intended to discourage licensed users from allowing their software to be reproduced, knowing that they readily could be identified from the unauthorized copy.

"Copy detection" systems alone do little to dissuade unauthorized copying as the software producer is unlikely to known when the software is illegally copied. External enforcement must be employed to track down and determine who is in possession of an illicit copy. Further, programs exist which permit serial numbers and names located in application programs to be located and erased. In an attempt to foil erasure of such information, one "copy detection" technique scatters the serial numbers and names in different sectors of the program storage disk, and hides the identifying information in the format. Because of the scattered program, the entire disk must be copied to ensure that all portions of the program are copied and in the process the identifying information is also copied. Such an approach while making it more difficult to erase identifying information, does not overcome the need for external enforcement to prevent further illicit copying.

Another technique used to dissuade unauthorized copying is "duplication limitation." "Duplication limitation" techniques include numerous approaches aimed at restricting the number of copies which can be made from a single software package.

"Duplication limitation" may be undertaken by placing restrictions within the computer program which either completely preclude copying or permit only a limited number of copies to be made. Such approach may employ a counter, located in the software, which allows a predetermined number of startings of a host program before destroying the program. For example, software packages have been designed such that, after one copy has been made, certain key features, or modules, of the package are obliterated to the extent that further copying is inhibited.

Another "duplication limitation" technique takes advantage of the hardware timer. "Date-dependent" programs are designed to match their ending calendar date with that of the hardware timer and to cess function if the ending calendar date has expired.

A relatively sophisticated "duplication limitation" scheme which has been employed in the art involves the use of a so-called "parasite" instruction set. This technique requires that a "parasite" be introduced after each stopping of the software program. The "parasite" changes one byte in the program in a predetermined manner after each stop. The parasite introduction commands are located in form at which is normally not able to be copied. Generally, also specified in the format is a "parasite killer" which restores altered bytes to their original condition.

"Duplication limitation" approaches may be overcome by unconventional programs which reproduce virtually each and every bit that is recorded in the original software package. "Duplication limitation" approaches further suffer from the disadvantage that they do not allow, or severely limit, legitimate backup copies to be made for archives. Programs depending on the clock date can be easily overcome by advancing the ending calendar date in the programs or altering the date in the hardware timer. "Parasite" techniques can be overcome by replicating the "parasite killer" such that it can be used to restore parasites in the unauthorized copies.

Another technique designed to reduce piracy is "copy inactivation." "Copy inactivation" includes a host of approaches aimed at rendering illicit copies useless or less than useful.

One "copy inactivation" technique involves insertion into the software artifacts whose locations are randomly determined when the software is initially placed on magnetic medium, such as a diskette, and which can only be reproduced under the original copying conditions. When illegal copying is attempted, the artifacts are obliterated; their absence is detected by a process in the software which reacts by altering the software program such that the program becomes un-executable.

"Copy inactivation" also has been effectuated by providing the software package recorded on the original diskette a so-called "boot-strap" program which, when executed, indicates that no further data is recorded. Thus when the original disk is copied, the boot-strap program is copied also, but in accordance with typical copying routines, the computer system is deceived into recognizing that no other data is available to be copied, the copied program therefore becoming useless.

"Copy inactivation" schemes may also take into account certain unique physical characteristics of the original software disk. For example, the sectors of "original" software packages are normally in alignment. A characteristic of this alignment is generally not carried over when the disk is copied. Thus execution of a software program may be made dependent upon detecting the alignment-associated characteristic of the "original" software package.

As with "duplication limitation" techniques, "copy-inactivation" techniques typically do not permit back-up copies of a hard-drive to be made. Some "copy-inactivation" schemes further restrict use of the software to the medium upon which the software originally was provided. "Boot-strap" schemes may be overcome by recognizing and obliterating the "boot-strap" program before copying. Copy protection schemes that incorporate some characteristic in the purchased software package which can be detected by a standard disk drive, but which cannot be reproduced by the drive, have not been found to be very effective as the usual mechanical tolerances found in disk drives minimizes the efficacy of such schemes.

One disadvantage attendant to typical "access limitation," "copy detection," "duplication limitation" and "copy inactivation" schemes is that they do not provide a means for preventing an authorized software program from being used by another individual on a different computer. Several proposal have been made to rectify this deficit.

U.S. Pat. No. 4,688,169 to Joshi discloses a computer software security system for restricting execution of a computer program to a particular machine. Such system provides for storage of an unique machine identification code in the hardware, firmware memory circuit or in the operating system software designated for the machine. The system further provides for a storage area within the software program for incorporating the unique machine identification code. The program provides a means for retrieving and comparing the machine identification code in the program with the machine identification code in the hardware, firmware, operating system etc., thus limiting execution to only one computer system.

U.S. Pat. No. 4,866,769 to Karp discloses copy protection for software distributed on diskettes. A unique first identification is provided in the read-only-memory ("ROM") of a personal computer in which the software on the diskette is to be used. The personal computer identification is accessible to the user of the computer. The vendor who wishes to protect its software from illegal copying or use provides a source identification on the diskette. The personal computer identification is used with the source identification on the distributed diskette to produce an encoded check word, using encryption techniques. The check word is generated and written onto the distributed diskette during installation and copied onto all backup versions made by the user's personal computer. Prior to each use of the program, the software on the diskette uses the personal computer and the source identifications and check word to verify that the software is being used on the same personal computer on which it was installed.

A method and system for preventing unauthorized use of software is further disclosed in U.S. Pat. No. 5,113,518 to Durst et al. Such system takes advantage of certain characteristics which often differ between different computer systems, such as bus size (e.g., 8-bit versus 16-bit bus line), computer clock speed, cyclic redundancy of ROM, random-access-memory ("RAM") wait states, disk drive rotation speed, read/write head access speed, and hard disk interleave value. These characteristics are measured and the values of the characteristics stored in the application program which is desired to be protected. When the application program is sought to be executed, the program redetermines the characteristics of the computer system and compares them against the stored values in the program. If the compared values are substantially the same, the application program is allowed to be executed.

U.S. Pat. No. 5,199,066 to Logan discloses a method and system for protecting software which makes use of an unique activation code provided by the software manufacturer. Such method entails inputting a unique hardware identification code into the hardware and inputting a first software code into the software. A first predetermined operation is performed upon the hardware code and the first software code to produce a first intermediate code. A unique activation code for the particular embodiment of the software employed is inputted and a second predetermined operation is performed upon the first intermediate code and the activation code to produce a second intermediate code. The second intermediate code is compared with a second software code uniquely associated with the particular embodiment of the software and stored at a hidden location within the software. The software is enabled for use if the second intermediate code and the second software code are identical.

U.S. Pat. No. 5,276,738 to Hirsch makes use of a pseudo-random number generator, scrambler and alphanumeric encoder to limit use of an application program to one computer. The system is designed to provide key values associated with software packages that cannot be easily duplicated and which contain information useful in license verification. The system generates a user key from a "seed" input binary value which preferably contains the serial number of the hardware device. Since the user key is generated in a pseudo-random fashion from the "seed" number, the user key is unique to the particular hardware to which the program was installed. The protection mechanism includes a means for taking an input binary value and generating a unique key value, as well as performing the reverse operation of taking a key value and generating an input binary value. In a simple case, the only value that need be obscured or safeguarded from disclosure is the seed value which is an arbitrary value selectable upon a last minute notice for generating valid key values. The system is designed such that design documentation, in addition to source code related to its implementation, are not required to be hidden. That is, without knowing all of the values used to generate the key value, it is not possible to predict what changes have to be made in the key in order to produce another valid 32 bit input binary value.

Each of these "computer unit-restricted" systems also suffer from weaknesses. U.S. Pat. Nos. 4,688,169, 4,866,769 and 5,199,066 all specify a hardware identification code be placed in the ROM of the computer or in a hardware component of the computer, requiring some agreement with hardware manufacturers as to the provision of such code, and the method of providing such numbers. U.S. Pat. No. 5,276,738 requires that the machine be provided with a pseudo-random number generator and requires that the user keep a record of the key number in order to operate the program. U.S. Pat. No. 5,113,518, while inhibiting hard drive copying, does not prohibit the program from being installed onto several different computers by duplicating the original disk and then installing the program by means of each copy. Further the '518 patent contemplates that the software routine includes a set-up procedure to store in the software itself the signature of the computer system. (col.5, ln.44–46) Thus the hardware parameters necessary to run the program may be determined by examining the software.

Therefore, there is a need for a software security method which dissuades both illicit copying and installation of application programs, which restricts operation of the application program to a single computer and/or user, which does not require the user to remember a key number for its operation, which does not permit an unauthorized user from gaining access to the application program by learning a secret key number or code, which does not require agreement with hardware providers to install unique identification codes in each and every computer, that permits the making of back-up copies of the hard-drive of a computer on which the protected application program is installed, which does not require vigilant policing of access to the program by the licensee, and which does not require external enforcement to dissuade illicit copying.

SUMMARY OF THE INVENTION

In accordance with this invention, a method and article of manufacture is provided whereby software application programs stored on a purveyor's original authorized disk, and those loaded from such disk onto a computer's hard-drive, are protected from illicit copying. Such system provides for controlled access to application programs based on the "licensee-status" of the person desiring to install and/or use the program and the identity of the data processing units upon which the application program is authorized to be stored.

The invention features a "installation key" required for installation of a workable application program into a memory storage area of the computer. The invention also features an "internal run key," generated by the program and stored in computer memory, which "unlocks" the application program if it is run on the computer system upon which the application program was first installed. The invention may further feature a user profile gate requiring an input characteristic of the user authorized to use the program prior to execution of the application program. The invention permits full backup of the hard-disk drive, such backup-disks containing the fully functioning application program for the computer on which it was first installed, but does not permit the application program to function on any computer, even on the computer on which it was originally installed, if the program alone is copied from the drive.

In one embodiment, an "install password" is generated upon executing the install program using the clock date of the hardware timer of the computer in an algorithm incorporated into the install programming. The "install password"

may be numeric and may be converted into an odd-even "install key number series" (e.g., 0 representing even numbers, and 1 odd numbers). Installation of the application program requires that the person desiring to install the program enter a "purveyor install key" which correlates to the "install key number series." Such "purveyor install key" can be ascertained by calling the purveyor of the software involved and providing the purveyor with the serial number of the software and the clock date on the hardware timer. The purveyor calculates the "install password" from the information provided by the user and may convert the same into an odd/even "purveyor install key" to match the odd/even "install key number series." Provision of the "purveyor install key" may be by oral means or by data communication means coupled directly to the computer upon which the program is being installed, as for example, by modem. Use of an odd/even number series obfuscates the actual password which is generated on the particular date the installation program is executed, thereby making it more difficult to resolve the algorithm used to generate the "install password."

In one embodiment of the invention, an "internal run key" is generated by the install program and hidden in a file addended to a directory/subdirectory outside of the application program. Such directory/subdirectory location may be chosen by random selection employing such means as a random or semi-random (as, for example, initial selection being based on date of initial installation) selection table or random number generator. The location of the "hibernating" "internal run key" is entered into an instruction line of the application program by means of an install program directive. The "internal run key" preferably relates to fixed parameters of the operating system upon which the application program is loaded. For example, the "internal run key" can be determined by means of an algorithm employing the descriptive number with respect to the processor employed by the computer, the bus size of the computer, the hard disk interleave value, etc. The "internal run key" algorithm may also use set parameters in the BIOS file or operating system for calculating an "internal run key." The "internal run key" is used to confirm that the application program is running on the same computer on which it was originally installed by comparing it to the "execution-time run key," determined from fixed parameters of the operating system each time that the application is program run, using the same or similar algorithm as employed to determine the "internal run key." The "execution-time run key" algorithm may be installed in the body of the operating system program rather than in a subroutine in order to determined illicit erasure.

The present invention may employ a user profile gate. Such gates may comprise programming instruction to compare user input against a previously stored user profile. For example, the profile gate may be a signature recognition program of a type well-known in the art which compares a user's signature against a database storing parameters related to the signature of an authorized user, e.g., a licensee. Signature input may be by means of mouse or other input devices attached to the computer. The profile gate may also consist of a number of questions, the answers to which are compared to the answers previously supplied to the same set of questions by the authorized user of the application program. A positive comparison between the stored authorized user profile and the profile provided by the present user of the system permits the application program to be fully executed.

In one embodiment of the invention, running of the installation program is necessary for activation of the application program. In this embodiment, the application program as written is "un-runnable" owing to nonsense instruction sets dispersed throughout the actual programming instructions of the application program. Such nonsense instructions may comprise non-readable instructions, infinite loops, repeats, dead-end instructions (e.g. termination instructions) etc. After appropriate authorization is received to run the installation program, the install program executes instruction sets to delete the nonsense instructions in the application program, permitting the application program to be executed provided the "execution-time run key" and "user profile" are confirmed.

The novel features which are believed to be characteristic of the invention both as to its organization and method of operation, together with further objects and advantages, may become more apparent when the prior description is read in connection with the below-described drawings. It is expressly understood, however, that each of the drawings is given for the purpose of illustration only and is not intended as a definition of the limits of the present invention.

BRIEF DESCRIPTION OF THE DRAWINGS

FIG. 1 illustrates components useful in the invention;

DETAILED DESCRIPTION OF THE INVENTION

Figure 1A:
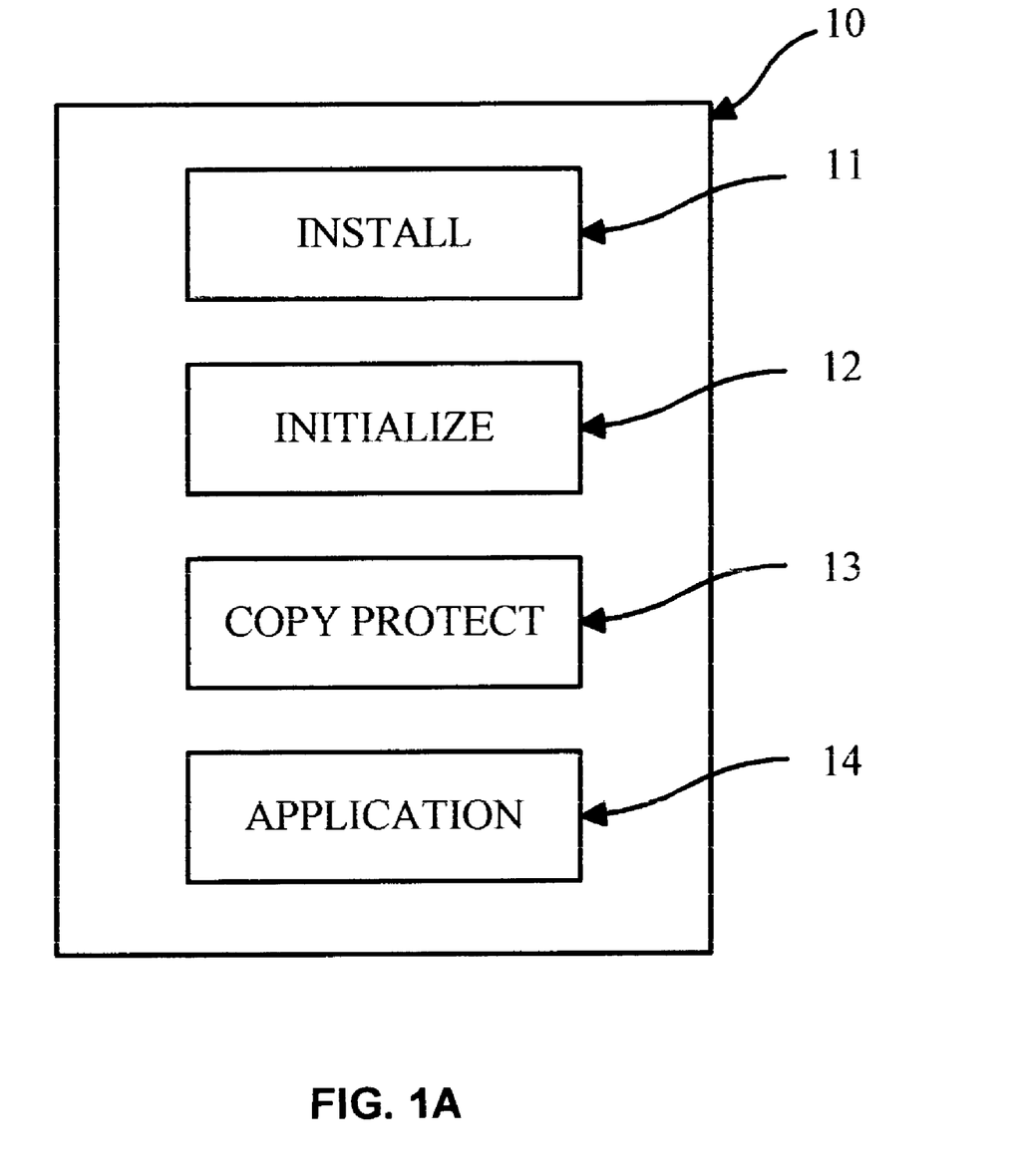
FIG. 1a illustrates the components of the invention in their application context.
Figure 1B:
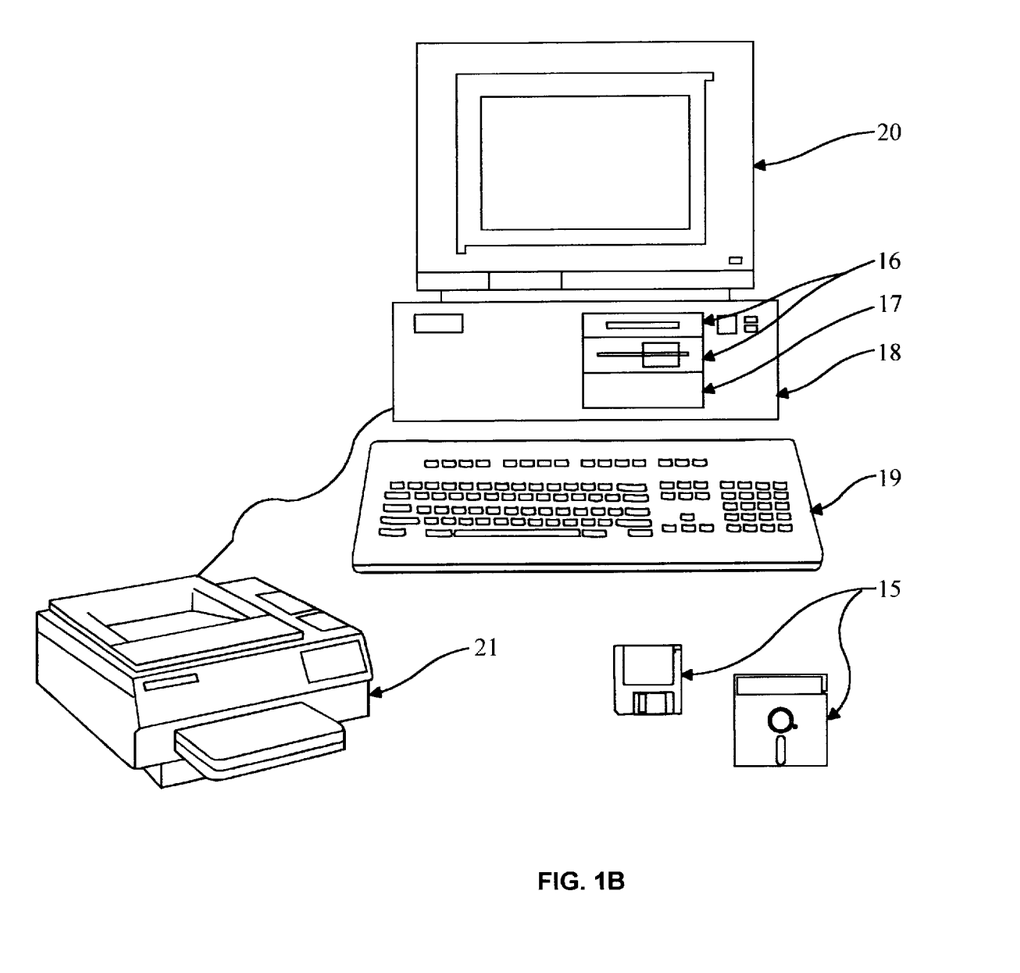
FIG. 1b is a perspective view of a personal computer and disks, within which is stored a computer program of the present invention.
Figure 1C:
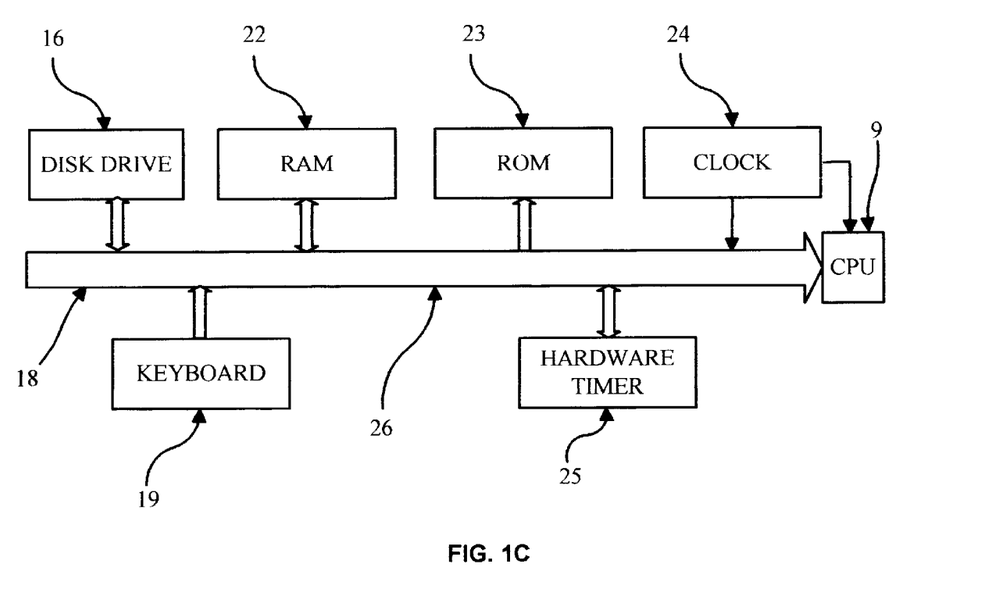
FIG. 1c is a block diagram of the configuration of a typical computer system in which the present invention may be employed.
Figure 2A:
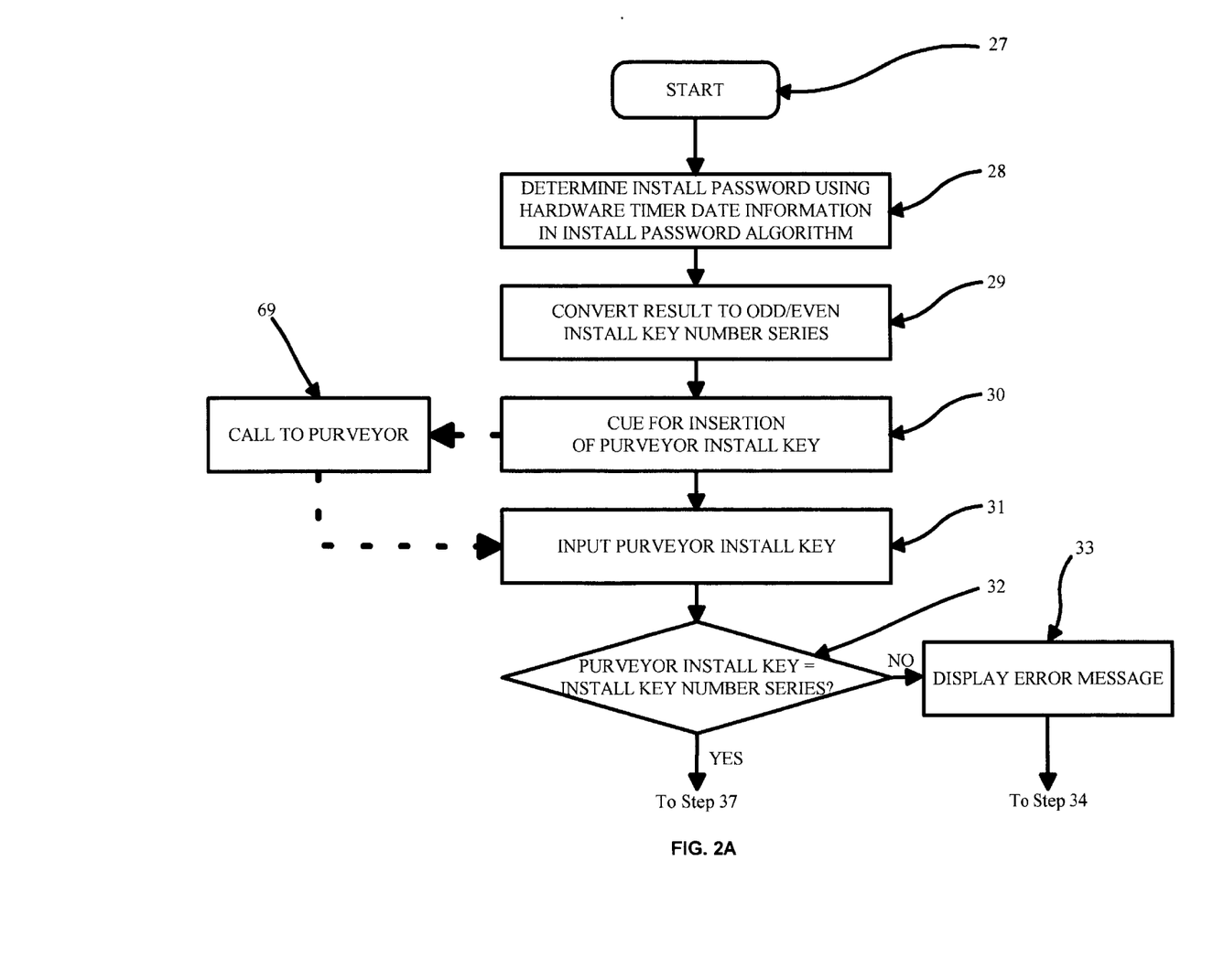
FIGS. 2A–2E are schematic flow diagrams depicting a programming routine of the present invention which may be employed to protect software from illicit copying.
Figure 2B:
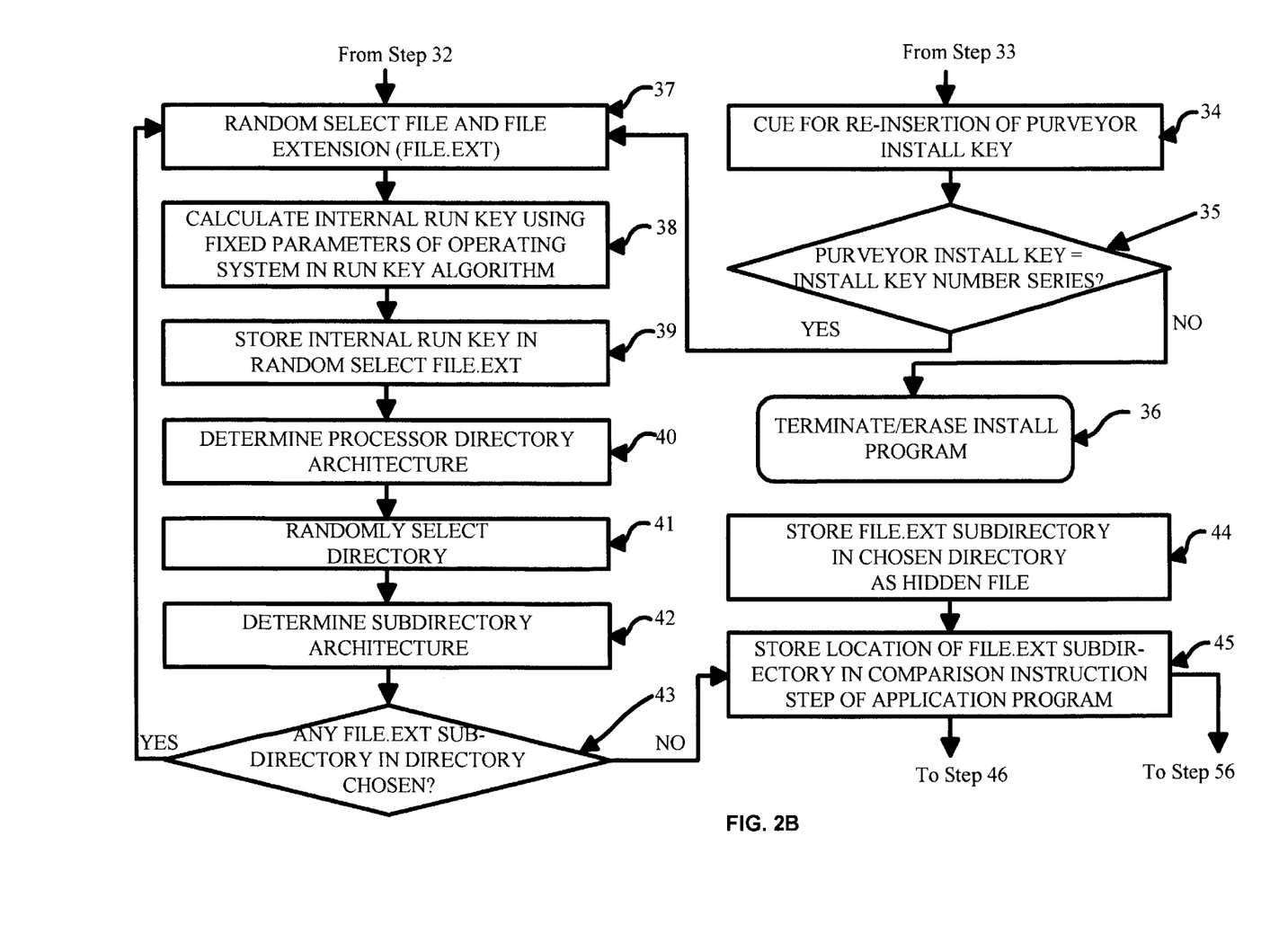
Figure 2C:
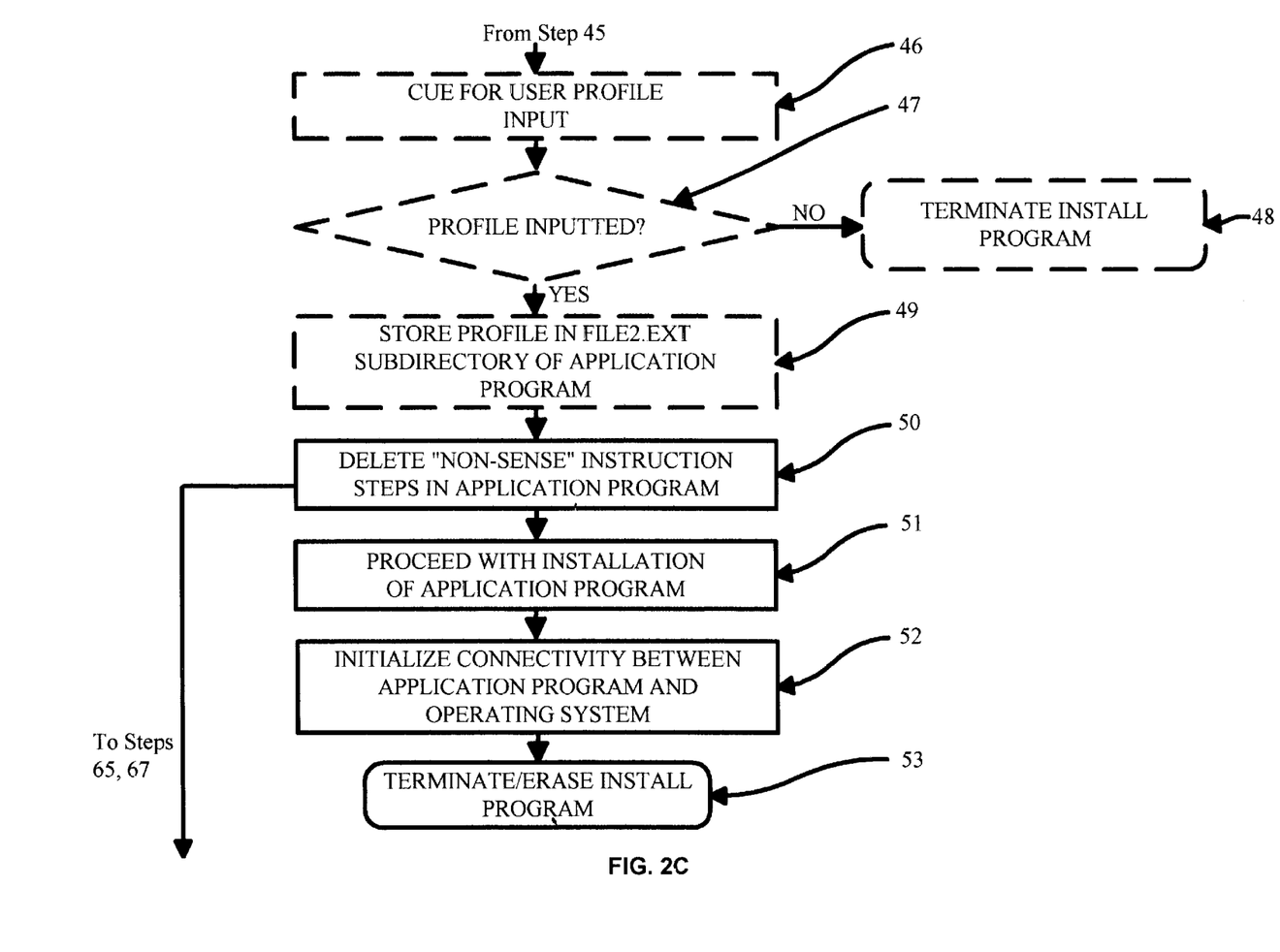
Figure 2D:
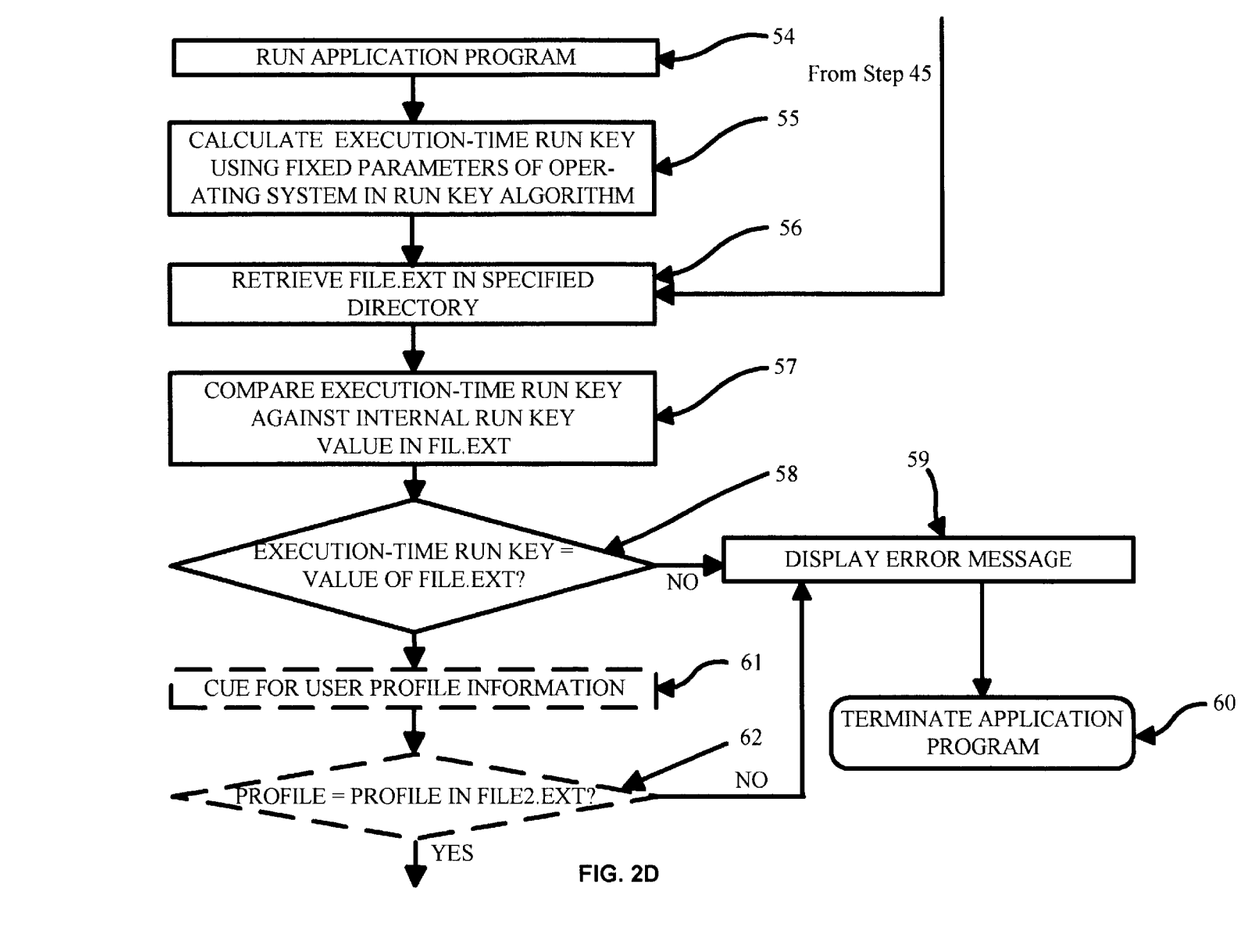
Figure 2E:
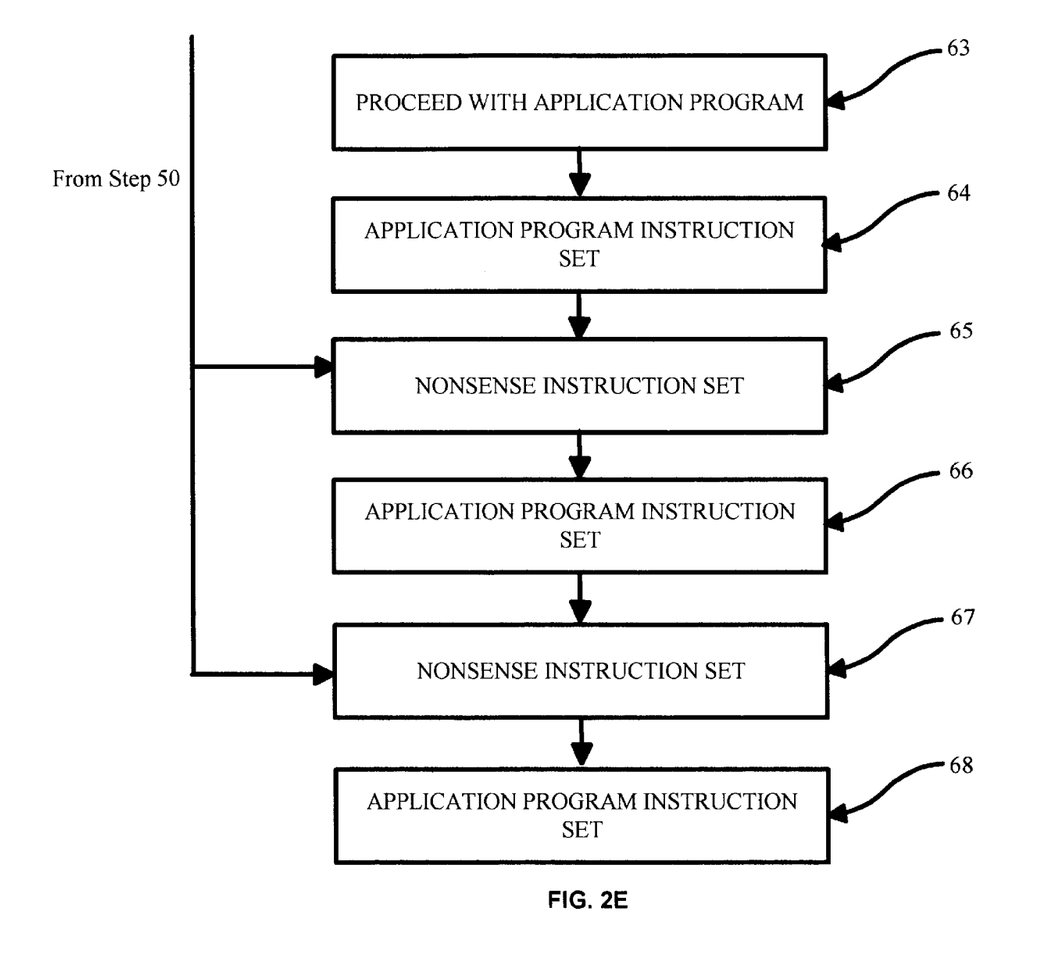

Referring to FIG. 1A of the drawings, the components of the invention in their application context are depicted. The software of the present invention is represented by program 10, FIG. 1A. In program 10, there resides an INSTALL module 11, an INITIALIZE module 12, and the main body of the application program 14. In addition, program 10 may have a COPY PROTECT module 13. Program 10 is typically stored on magnetic media such floppy and hard disks 15 (FIG. 1b). Disks 15 may be employed to load the application program into a conventional personal computer system as shown in FIG. 1b, or any other system that uses or operates with software such as video game playing devices. Conventional personal computer 18 includes a standard keyboard 19, a standard cathode ray tube (CRT) monitor 20, disk drives 16 and hard drive 17. Conventional personal computer 18 is shown to be further connected to laser printer 21. FIG. 1c illustrates in block diagram form a typical configuration of the data processing system of computer 18 in which the present invention may find employment. As shown, this configuration includes central processing unit 9, a random-access-memory ("RAM") 22, a read-only-memory ("ROM") 23, clock generator 24 and hardware timer 25. Data processing system of computer 18 receives data input from data input means, such as keyboard 19. The illustrated elements are coupled, directly or indirectly, to data and control bus 26 by which digital and control signals are transmitted from one element to another, generally under the control of central processing unit 9. ROM 23 is conventional and, as is understood by those of ordinary skill in the art, stores basic programs and data which are used by central processing unit 9 to carry out various operations. RAM 22 is also conventional, and as understood in the art, provides work space in the processing of data input. Clock generator 24, as is conventional, functions to synchronize the operations of the central processing unit with other peripheral devices coupled to control bus 26. Hardware timer 25 is a timing circuit separate and apart from clock generator 24. Hardware timer 25 is usually used to generate time-of-day information, memory refresh time, and the like. As the various elements illustrated in FIG. 1c are conventional and operate in a manner known to those of ordinary skill in the art, further description of the elements and their interaction and operation is not provided.

Referring now to FIG. 2A–2E, there are shown schematic flow diagram depicting a programming routine of the present invention which may be employed to protect software from illicit copying. Installation system verification according to the invention starts at step 27. An install password is determined at step 28 using an install password algorithm which may be incorporated into the install program. The install password algorithm may use hardware-timer date information as a variable such that the install password changes as the date of the hardware-timer changes. After determination of the install password, as represented at step 28, such password may be converted (step 29) to an odd-even install key number series. Subsequently, the user is cued for input of a purveyor install key (step 30) requiring a call to the purveyor being made (step 69). The purveyor may determine the install password, and thus the odd/even key number series necessary to "unlock" the install program, by determining the lock algorithm which is employed in the software from a software serial number supplied by the installer and by ascertaining the date time of the installer's computer. Preferably, the purveyor provides an odd/even purveyor install key to the computer via modem, however, the purveyor can also provide such information verbally to the installer for input of such install key by installer (step 31). The inputted purveyor install key is compared against the internally generated install key number series at inquiry step 32. If the numbers do not correspond a display error message is flashed (step 33) and the installer is cued once more for re-insertion of the purveyor install key (step 34) and again the purveyor install key is compared to the install key number series (inquiry step 35). If the purveyor install key inputted does not equal the install key number series once more the install program may be terminated or erased (step 36). If the purveyor install key is found to equal the install key number the program directs a random selection of a file and file extension at step 37. An internal run key is then calculated at step 38 by means of an internal run key algorithm employing values indicative of fixed parameters of the operating system, such as bus size or hard disk interleave value, as variables.

The internal run key is stored at step 39 in a randomly selected file.ext. The processor directory architecture is determined at step 40, a directory randomly selected at step 41, the subdirectory architecture of the chosen directory determined at step 42 and the file.ext compared to the subdirectories to determine if there is any prior file.ext subdirectory in the directory chosen at step 43. If a file.ext subdirectory already exists in the directory, then a new file and file extension are randomly chosen and the process repeated. If the file.ext is not in the subdirectory chosen, the file.ext is stored in the chosen directory as a hidden file (step 44) and the location of the file.ext is entered into a run key comparison instruction step of the application program (inquiry step 45). The install program may further cue for insertion of user profile information (step 46) such as a signature, terminating the install program (step 48) if the profile information is not received after inquiry (step 47). Profile information is stored in a file2.ext subdirectory housed in the application program (step 49) or as with the hidden file elsewhere on the hard disk. The install program subsequently deletes "nonsense instruction" steps in the application program as represented at step 50. Such nonsense instructions may include infinite loop commands such as:

---
WHILE [1]
{ }
END WHILE

---

The install program is then continued as represented at step 51 and connectivity between the application program and operating system is initialized at step 52. Upon completion of installation of the application program, the install program terminates or may be programmed to be erased (step 53).

The steps of run verification are shown beginning at step 54. At step 55, the run key for the date on which the application program is being run is determined using the same fixed parameters of the operating system as used to determine the internal run key stored in file.ext in the chosen directory. The file.ext is retrieved from the specified directory in which it is stored (step 56) and compared against the execution-time run key (step 57). If the execution-time run key is found at inquiry step 58 to equal the internal run key value of file.ext then the user is subsequently cued for input of user profile information as represented by step 61. If the execution-time run key does not equal the internal run key value of file.ext an error message is displayed (step 59) and the application program is terminated (step 60). Profile information input at time of execution of the application program is compared to the profile stored in file2.ext as represented by step 62. Again if the profiles do not match, an error message is displayed (step 59) and the application program terminated (step 60). If the profiles match than the application program is continued as represented by step 63 through the application program instruction sets 64, 66, 68 devoid of the nonsense instruction sets 65, 67.

Figure 3:
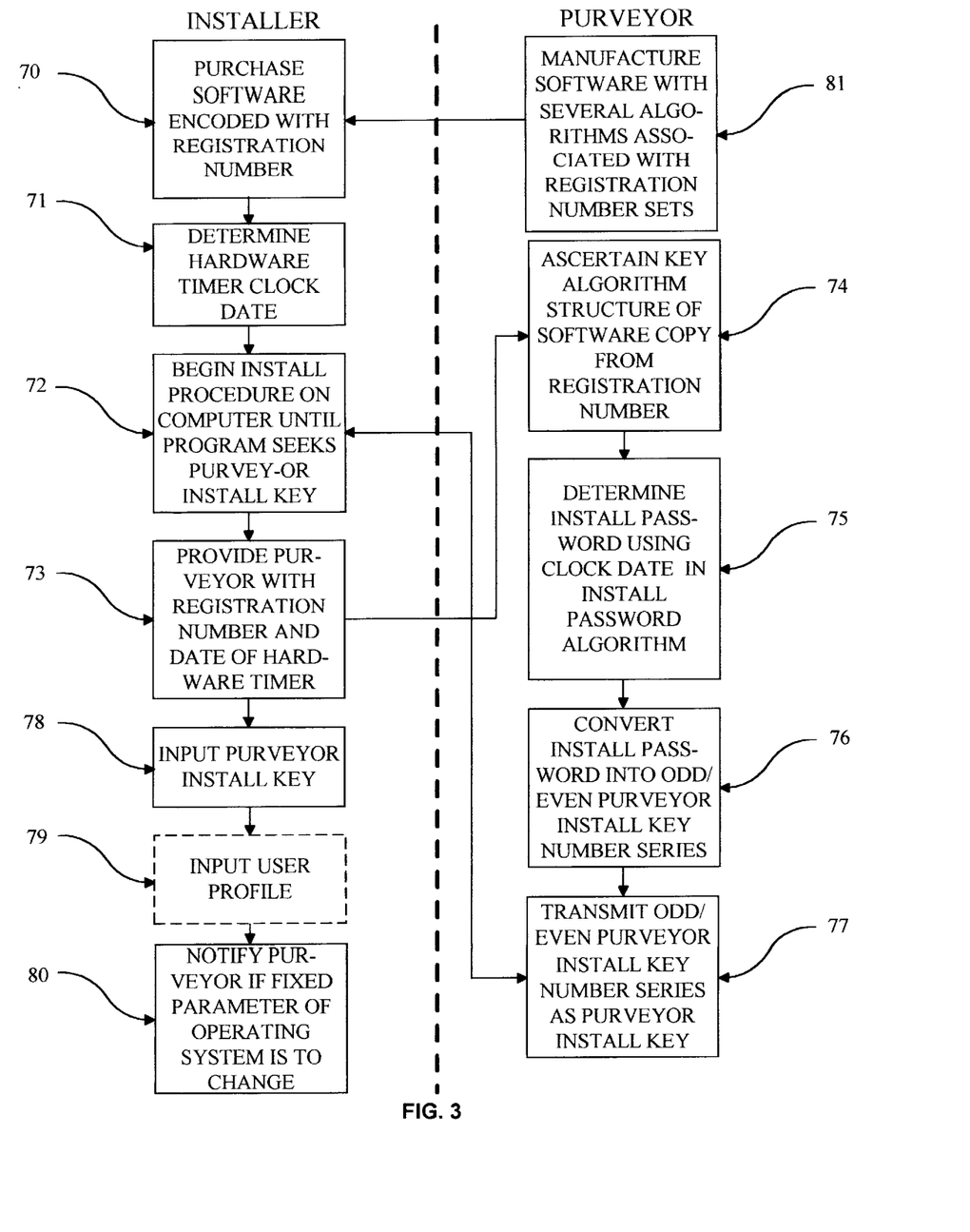
FIG. 3 is a block diagram flowchart of the process by which an applications program may be installed onto a computer system employing the present invention.

Now referring to FIG. 3 there is shown a block diagram flow chart of the process by which an applications program may be installed onto a typical computer system 18. Purveyor may manufacture software such that certain registration numbered software programs use one password algorithm, while other registration numbered software programs use different algorithms as represented by block 81. The purchaser purchases the software encoded with the registration number intact as represented by block 70 and is prompted to determine the hardware clock date (block 71) prior to installation of the application program. The installation program is continued until the program seeks the purveyor install key (block 72) and the installer is prompted to contact the purveyor to obtain the purveyor install key upon provision of the software registration number and date of the hardware timer (block 73). Upon receipt of such information from the installer, the purveyor ascertains the key algorithm utilized in the software copy from the registration number provided (block 74), calculates the install password using the clock date in the install password algorithm (block 75), converts the install password into an odd/even purveyor install key number series (block 76), and transmits the odd/even purveyor install key number series as the purveyor install key (block 77). The purveyor install key is input by the installer (block 78). The install program may also request that the user input a user profile (block 79). In order for the application program to continue to run, the installer must notify the purveyor if a fixed parameter of the operating system is to change (block 80). The purveyor may alter the internal run key by programming means or by requiring re-installation of the application program. The installer may also be prompted to input a user profile (block 79), such as a signature.

Although specific embodiments of the present invention have been described in detail above, various modifications thereto would be readily apparent to one with ordinary skill in the art. All such modifications are intended to be included within the scope of the present invention as defined by the following claims.

What is claimed is:

1. A software security system for restricting unauthorized duplications and installation of an application program comprising:

a software instruction-set means for restricting the installation of said application program to persons authorized to install said application program, said software instruction-set means for restricting installation being incorporated into an installation program routine for installing said application program onto one or more data processing systems;

a software instruction-set means for restricting utilization of said installed application program to said one or more data processing systems onto which said application program was originally installed, said software instruction-set means for restricting data processing system utilization being incorporated into said application program;

wherein said application program has nonsense instruction sets dispersed throughout its program routine;

wherein said installation program routine includes a software instruction set means for removing said nonsense instruction sets in said application program upon installation of said application program on said one or more data processing systems;

and wherein said application program is permitted to be executed upon confirmation of an internal run key.

2. The software security system of claim 1 wherein said software instruction-set means for restricting installation of said application program employs a time-variable authorization code.

3. The software security system of claim 1 wherein said software instruction-set means for restricting utilization of said application program to the one or more data processing systems on which said programming was installed employs an authorization code related to fixed parameters of the operating system of said data processing system.

4. A method for protecting against unauthorized duplication and installation of a software application program recorded within a storage medium for use in a data processing unit comprising the steps of:

storing within said software application program a nonsense instruction-set such as to make said software application program unexecutable;

performing a first predetermined operation upon initiation of installation of said software application program onto said data processing unit to determine an application program installation key;

storing said application program installation key in a first data storage area of said data processing unit;

performing a second predetermined operation upon initiation of installation of said software application program onto said data processing unit to determine an internal run key;

storing said internal run key in a second data storage area of said data processing unit;

obtaining said installation key from the purveyor of said software application program;

inputting said purveyor installation key into said data processing unit;

comparing said purveyor installation key with the installation key in said first data storage area;

installing said application program in a data storage area of said data processing unit upon match between said purveyor installation key and said installation key stored in said first data storage area;

performing a third pre-determined operation upon initiation of execution of said installed software application program to determine an execution-time run key;

comparing said execution-time run key within said internal run key stored in said second data storage area;

permitting full execution of said application program upon determining correspondence between said execution-time run key and said internal run key stored in said second data storage area;

placing within an installation program for installing said application program onto said data processing unit an instruction-set for removing, by deleting, nonsense instruction sets placed in said application program, upon installation of said application program.

5. A software security system for restricting unauthorized duplications and installation of an application program comprising:

an application program having nonsense instruction sets placed in its instruction routine;

an installation program having a software instruction-set for removing, by deleting said nonsense instruction sets from said application program;

a software instruction set for storing information unique to the profile of an authorized user in said application program;

an input means for inputting information unique to the profile of said authorized user;

software comparison means for comparing said unique stored profile information with said inputted unique profile information;

wherein said application program further has a software instruction set for limiting access to said application if said stored unique profile information does not match said inputted unique profile information.

* * * * *